United States Patent [19]
Hoag et al.

[11] Patent Number: 5,346,723
[45] Date of Patent: Sep. 13, 1994

[54] METHOD FOR CURING ORGANOSILOXANE COMPOSITIONS IN THE PRESENCE OF CURE INHIBITING MATERIALS

[75] Inventors: Carol A. Hoag; Steven W. Wilson, both of Midland, Mich.

[73] Assignee: Dow Corning Corporation, Midland, Mich.

[21] Appl. No.: 88,955

[22] Filed: Jul. 12, 1993

[51] Int. Cl.$^5$ .................. B05D 3/10; B32B 27/26; C09D 183/05

[52] U.S. Cl. .................. 427/302; 428/447; 528/15; 528/31

[58] Field of Search .................. 427/302; 428/447

[56] References Cited

FOREIGN PATENT DOCUMENTS 471475 2/1992 European Pat. Off. .
96457 5/1985 Japan .

OTHER PUBLICATIONS

Derwent Abstract #85-167777/28, JP60-96457, Derwent, Inc. McLean, Va. (1985).

*Primary Examiner*—John C. Bleutge
*Assistant Examiner*—Donald R. Wilson
*Attorney, Agent, or Firm*—Robert Spector

[57] ABSTRACT

The inability of organosiloxane compositions containing an organohydrogensiloxane as the curing agent and a platinum group metal-containing catalyst to cure completely on substrates containing residues of solder fluxes or other cure-inhibiting materials can be remedied by coating at least that portion of the substrate containing the residue with a layer of an organosilicon compound containing at least two silicon-bonded hydrogen atoms per molecule prior to application of the curable organosiloxane composition.

4 Claims, No Drawings

METHOD FOR CURING ORGANOSILOXANE COMPOSITIONS IN THE PRESENCE OF CURE INHIBITING MATERIALS

BACKGROUND OF THE INVENTION

1. Field of the Invention

This invention relates to a method for curing organosiloxane compositions. More particularly, this invention relates to a method for curing organosiloxane compositions by a platinum group metal catalyzed hydrosilation reaction in the presence of cure-inhibiting impurities such as carboxylic acids. The present method is particularly useful for curing gels used as protective coatings for electronic components in the presence of "no-clean" solder fluxes containing carboxylic acids.

2. Background Information

Organosiloxane materials elastomers resins and gels exhibit a number of physical, chemical and electrical properties that make them desirable for use as coatings, encapsulants and potting materials for electronic and electrical components.

In typical applications, curable organosiloxane compositions are applied to substrates such as printed circuit boards to which electronic components such as transistors, integrated circuits and other solid state devices have been attached by soldering. The organosiloxane composition is then cured. In many applications gels are more desirable than elastomeric or resinous materials based on their low modulus, which allows these materials to expand in response to stresses resulting from heat-induced expansion of electronic components. If not relieved these stresses are sufficient to cause breakage of delicate wire bonds and other parts, resulting in malfunction of the component.

Organosiloxane compositions that cure by a hydrosilation reaction are preferred for protection of electrical and electronic circuits because they cure at relatively low temperatures and do not generate by-products during curing. The curing reaction involves alkenyl radicals such as vinyl and silicon-bonded hydrogen atoms.

One disadvantage of organosiloxane compositions that cure by the reaction of silicon-bonded hydrogen atoms is the ability of silicon-bonded hydrogen atoms to react with water and organic compounds containing hydroxyl groups. These reactions reduce the number of silicon-bonded hydrogen atoms available to cure the organosiloxane composition. In particular, it has been difficult to completely cure organosiloxane compositions using a hydrosilation reaction or the reaction between silicon bonded hydrogen atoms and silanol ($\equiv$SiOH) groups in the presence of organic compounds such as alcohols and carboxylic acids.

A recent trend in the electronics industry has been to eliminate the organic solvents formerly used to remove fluxes that facilitate soldering of components to printed circuit boards. These fluxes contain relative large amounts of carboxylic acids. The present inventors discovered that the acids present in the flux react with a portion of the silicon-bonded hydrogen atoms present in the curable composition, thereby reducing the amount of organohydrogensiloxane available for curing the organosiloxane composition. Because the organohydrogensiloxane is distributed throughout the curable organosiloxane composition, it is difficult to estimate the amount of organohydrogensiloxane that will react with the solder flux. Adding an excess of the organohydrogensiloxane to the curable composition to compensate for the amount that will react can result in an excessive degree of crosslinking and a cured product that is too hard or brittle if not all the excess organohydrogensiloxane reacts with the solder flux.

An preferred objective of this invention is to provide a method for curing organosiloxane compositions in the presence of "no-clean" solder fluxes, where the curing agent is an organohydrogensiloxane.

SUMMARY OF THE INVENTION

The objectives of this invention can be achieved by applying an organohydrogensiloxane containing at least two silicon-bonded hydrogen atoms per molecule as a primer over a solder flux or other material containing cure-inhibiting impurities such as carboxylic acids. When the substrate is subsequently coated with an organosiloxane composition containing an organohydrogensiloxane as the curing agent, the composition will cure uniformly without substantially affecting the extent of curing or physical properties of the cured material in the area of the solder flux. The present method is particularly applicable when the cured material is a gel that must remain relatively soft throughout its entire volume for extended periods of time.

The present method can also be used to cure organosiloxane compositions by the reaction between silicon-bonded hydrogen atoms and silicon-bonded hydroxyl groups, also referred to as silanol groups, when the substrate on which the compositions are to be cured contains a carboxylic acid.

DETAILED DESCRIPTION OF THE INVENTION

This invention provides a method for curing an organosiloxane composition containing an organohydrogen-siloxane as the curing agent in the presence of a material comprising at least one cure inhibiting component, said method comprising the sequential steps of 1) applying, to at least those portions of the surface of said substrate containing said material, a layer of a liquid organosilicon compound containing at least two silicon-bonded hydrogen atoms per molecule, 2) applying a curable organosiloxane composition over the layer of liquid organosilicon compound, the composition comprising A) an organosilicon compound containing an average of at least two alkenyl radicals or silanol groups per molecule;

B) an amount of an organohydrogensiloxane sufficient to cure said composition, where said organohydrogensiloxane contains an average of at least two silicon-bonded hydrogen atoms per molecule, with the proviso that the sum of the average number of alkenyl radicals or silanol groups per molecule present in said polyorganosiloxane and the average number of silicon-bonded hydrogen atoms per molecule in said organohydrogensiloxane is greater than 4; and C) an amount of a catalyst sufficient to promote curing of said composition, where said catalyst is a platinum group metal or a compound of said metal; and 3) exposing said composition to conditions that promote curing of said composition in the presence of said catalyst.

The Primer Compound

The novelty of the present method resides in applying a layer of a liquid organosilicon compound containing at least two silicon-bonded hydrogen atoms per molecule over a material containing a carboxylic acid, such as a self-cleaning solder flux, prior to coating the substrate containing the material with a curable organosiloxane composition containing an organohydrogensiloxane as the curing agent.

Any organosilicon compound containing at least two, preferably at least three, silicon-bonded hydrogen atoms per molecule can be applied over the acid-containing material as a primer in accordance with the present method. Suitable organosilicon compounds include silanes and organohydrogen-siloxanes. When the organosilicon compound is an organohydrogensiloxane it can be linear or cyclic.

While not willing to be bound to this theory, it is believed that at least a portion of the silicon-bonded hydrogen atoms in the organosilicon compound used as the primer reacts with the carboxylic acid or other cure-inhibiting impurity on the substrate and a portion reacts with the alkenyl radicals or silanol groups of the polyorganosiloxane ingredient of the curable composition that is subsequently applied over the primer layer. The primer layer thus becomes part of the final cross-linked polymer network. Organohydrogensilanes and organohydrogensiloxanes containing only one silicon-bonded hydrogen atom per molecule are not capable of reacting in this manner.

The organosilicon compound used as the primer in accordance with the present method is a liquid at 25° C. and can have a linear or branched structure. When this organosilicon compound is a silane it is represented by the formula $H_xR^1_{(4-x)}Si$. When the compound is a siloxane the siloxane units include but are not limited to $HR_2^1SiO_{\frac{1}{2}}$, $HR^1SiO$, $HSiO_{3/2}$ and, optionally $R_3^2SiO_{\frac{1}{2}}$, $R_2^2SiO$ and $R^2SiO_{3/2}$. $R^1$ and $R^2$ in these formulae represent monovalent hydrocarbon radicals that can be substituted or unsubstituted and x is 2 or 3.

When more than one $R^1$ and/or $R^2$ are present in a single compound, the hydrocarbon radicals can be identical or different. These hydrocarbon radicals can contain from one up to ten or more carbon atoms, and include but are not limited to alkyl such as methyl and ethyl, cycloalkyl such as cyclohexyl, aryl such as phenyl and naphthyl, alkaryl such as tolyl and aralkyl such as benzyl. Preferred hydrocarbon radicals are methyl, ethyl, phenyl and 3,3,3-trifluoropropyl.

Preferred organohydrogensiloxanes for use as primers in accordance with the present method include but are not limited to polyorganohydrogensiloxanes, organohydrogensiloxane/diorganosiloxane copolymers and diorganohydrogensiloxy-terminated polydiorganosiloxanes, where the organic groups are one or more of the aforementioned hydrocarbon radicals.

The viscosity of the organohydrogensiloxane primer is limited only by the ability to apply the compound using conventional coating techniques, which include brushing, dipping and spraying. Viscosities of from 0,001 to 10 Pa. s are suitable.

Because the organosilicon compound used as the primer is a liquid, the compound can be applied over the acid containing material without the necessity of diluting it with miscible solvents such as liquid hydrocarbons or polydiorganosiloxanes free of any groups capable of reacting with the curable composition that is subsequently applied over the primer layer. The use of such solvents and diluents may be desirable for certain applications, for example to promote wetting of the substrate. Liquid triorganosiloxy terminated polydimethylsiloxanes are particularly suitable diluents.

In accordance with the present method a priming layer of the organosilicon compound containing silicon-bonded hydrogen atoms is applied over the cure-inhibiting material, such as one of the commercially available "no-clean" solder fluxes, present on the substrate to be coated with the curable organosiloxane composition. The primer can be applied using any suitable technique, including but not limited to brushing, dipping and spraying. For relatively small areas the primer can be applied dropwise on to the substrate from a suitable dispenser and allowed to flow out as a continuous layer over the surface of the substrate. The primer layer should be as thin as possible, typically 0.001 inch (0.025 mm) or less.

The ingredients of the curable composition that is applied over the primer layer will now be discussed in detail.

The Alkenyl- or Silanol-Containing Polyorganosiloxane (Ingredient A)

The polyorganosiloxane referred to as ingredient A of the curable compositions applied over the primer layer in accordance with the present method must contain at least two silicon-bonded alkenyl radicals or silanol groups in each molecule. The alkenyl radicals contain from 1 to about 10 carbon atoms and are exemplified by but not limited to vinyl, allyl and 5-hexenyl. The silicon-bonded organic groups other than alkenyl radicals present in ingredient A are typically monovalent hydrocarbon and halogenated hydrocarbon radicals exemplified by but not limited to alkyl radicals such as methyl, ethyl and propyl; aryl radicals such as phenyl; and halogenated alkyl radicals such as 3,3,3-trifluoropropyl.

The molecular structure of ingredient A is typically linear, however there can be some branching due to the presence of trivalent siloxane units within the molecule. The molecular weight of this ingredient should be sufficient to achieve a viscosity at 25° C. greater than about 0.1 Pa.s. The upper limit for the molecular weight of ingredient A is not specifically restricted, and is typically limited only by the processability of the curable organosiloxane composition. The polyorganosiloxanes range from pourable liquids to gum type polymers that are typically characterized by Williams plasticity values.

Preferred embodiments of ingredient A are polydiorganosiloxanes represented by the general formula I

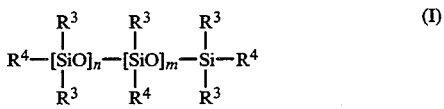

(I)

where each $R^3$ is individually selected from monovalent hydrocarbon radicals and monovalent halohydrocarbon radicals, $R^4$ represents a vinyl or other alkenyl radical or a hydroxyl group , m is 0 or a positive integer and the sum of m and n represents a degree of polymerization equivalent to a viscosity of at least 400 centipoise ( 0.4 Pa. s ) .

The two $R^3$ substituents on each of the silicon atoms in formula I can be identical or different, and can contain from 1 to about 20 carbon atoms. A range of from 1 to 10 carbon atoms is preferred based on the availability of the corresponding monomers. Most preferably at least one of the hydrocarbon radicals on each silicon atom is methyl, and any remainder are vinyl, phenyl and/or 3,3,3-trifluoropropyl, this preference being based on the availability of the reactants typically used to prepare the polydiorganosiloxane and the properties of cured elastomers prepared from these polydiorganosiloxanes. For the same reasons, $R^4$ is preferably vinyl or 5-hexenyl.

Representative embodiments of ingredient A containing ethylenically unsaturated hydrocarbon radicals only at the terminal positions include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

Methods for preparing ingredient A of the present compositions by hydrolysis and condensation of the corresponding halosilanes or by condensation of the cyclic polydiorganosiloxanes are sufficiently disclosed in the patent and other literature that a detailed description in this specification is not necessary.

The Organohydrogensiloxane (Ingredient B)

The curable organosiloxane compositions contain at least one organohydrogensiloxane that functions as a crosslinker for ingredient A. In the presence of the hydrosilation catalyst, referred to as ingredient C, the silicon-bonded hydrogen atoms in ingredient B undergo an addition reaction, referred to as hydrosilation, with the silicon-bonded alkenyl groups or silanol groups in ingredient A, resulting in crosslinking and curing of the composition.

Ingredient B must contain at least 2 silicon-bonded hydrogen atoms in each molecule. If ingredient A contains only two alkenyl radicals or silanol groups per molecule, ingredient B must contain an average of more than two silicon-bonded hydrogen atoms to achieve a crosslinked structure in the final cured product. The silicon-bonded organic groups present in ingredient B are selected from the same group of monovalent hydrocarbon and halogenated hydrocarbon radicals as the organic groups of ingredient A, with the proviso that the organic groups in ingredient B must be substantially free of ethylenic or acetylenic unsaturation. The molecular structure of ingredient B can be straight chain, branch- containing straight chain, cyclic, or network.

Ingredient B is selected from the same class of organohydrogensiloxanes as the compound using as a primer in accordance with the present method.

While the molecular weight of ingredient B is not specifically restricted, viscosities in the range of 3 to 10,000 centipoise (0.003 to 10 Pa.s) at 25 degrees Centigrade are preferred.

The concentration of ingredient B is sufficient to provide a molar ratio of silicon-bonded hydrogen atoms to alkenyl radicals or silanol groups in the curable composition of from 0.3 to 20. A range of from 0.4 to 2 is preferred. When the cured product is a gel that cures by a platinum group metal catalyzed hydrosilation reaction, the curable composition contains a stoichiometric excess of alkenyl radicals or silicon-bonded hydrogen atoms. The unreacted ingredient provides the desired degree of hardness in the cured gel.

When the curable composition contains less than about 0.3 mole of silicon-bonded hydrogen atoms per mole of alkenyl radicals or silanol groups the composition cannot be satisfactorily cured. Bubble formation resulting from the generation of hydrogen gas can occur when the composition contains more than about 20 silicon-bonded hydrogen atoms per alkenyl radical or silanol group.

The Platinum-Containing Hydrosilation Reaction Catalyst (Ingredient C)

Curing of the present compositions is catalyzed by a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is preferably equivalent to a platinum concentration of from 0.1 to 500 parts by weight of platinum metal, more preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

OPTIONAL INGREDIENTS

Platinum Catalyst Inhibitors

Mixtures of the aforementioned ingredients A, B and C may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

Amines will impart long-term storage stability to the present compositions relative to acetylenic compounds. Polyfunctional amines such as the N,N,N',N'-tetraalkyldiamines are preferred for this purpose.

Another class of catalyst inhibitors are alkenyl substituted siloxanes of the type described in U.S. Pat. No. 3,989,667, which issued oil Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

Some compositions may begin to cure under ambient conditions even when an inhibitor is present. One way to ensure storage stability is to package the ingredients of the curable composition in two or more containers, with the hydrosilation catalyst and the organohydrogensiloxane in separate containers. The contents of the containers are combined when it is desired to cure the composition.

One-part organosiloxane compositions having excellent long-term storage stability at temperature of up to 50° C. or higher can be prepared by first microencapsulating the platinum-containing hydrosilation catalyst in a thermoplastic or thermosetting polymer. Curable organosiloxane compositions containing microencapsulated hydrosilation catalysts are described in U.S. Pat. No. 4,766,176, which issued on Aug. 23, 1988 and U.S. Pat. No. 5,017,654, which issued on May 21, 1991. The teaching of these patents relating to storage stable one-part organosiloxane compositions is incorporated herein by reference. Suitable encapsulants include but are not limited to organosilicon resins and organic resins derived from ethylenically unsaturated hydrocarbons and/or esters of ethylenically unsaturated carboxylic acids such as acrylic and methacrylic acids.

Reinforcing Fillers

When it is desired to achieve high levels of tear strength and other physical properties in the cured elastomers that can be prepared using the compositions and method of this invention, it may be desirable to include a reinforcing filler such as finely divided silica. Silica and other reinforcing fillers are often treated with one of more of the known filler treating agents to prevent a phenomenon referred to as "creping" or "crepe hardening" during processing of the curable composition.

Finely divided forms of silica are preferred reinforcing fillers. Colloidal silicas are particularly preferred because of their relatively high surface area, which is typically at least 50 square meters per gram. Fillers having surface areas of at least 300 square meters per gram are preferred for use in the present method. Colloidal silicas can be of the precipitated or a fume type. Both types of silica are commercially available.

The amount of finely divided silica or other reinforcing filler used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The filler treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the filler to form compounds with silicon-bonded hydroxyl groups. Preferably at least a portion of the silicon bonded hydrocarbon radicals present on the treating agent are identical to a majority of the hydrocarbon radicals present in ingredients A and B. A small amount of water can be added together with the silica treating agent(s) as a processing aid.

It is believed that the treating agents function by reacting with silicon-bonded hydroxyl groups present on the surface of the silica or other filler particles to reduce interaction between these particles.

When a silica filler is used, it is preferably treated in the presence of at least a portion of the other ingredients of the present compositions by blending these ingredients together until the filler is completely treated and uniformly dispersed to form a homogeneous material. The ingredients that are present during treatment of the filler typically include the silica treating agents and at least a portion of the polydiorganosiloxane(s) referred to herein as ingredient A.

Additional Optional Ingredients

The present organosiloxane compositions can contain one or more additives that are conventionally present in curable compositions of this type to impart or enhance certain physical properties of the cured composition, such as adhesion, heat stability and flame retardancy, or to facilitate processing of the curable composition.

Typical additives include but are not limited to non-reinforcing fillers such as quartz, hydrated alumina, mica and calcium carbonate; pigments such as carbon black and titanium dioxide; dyes, flame retardants, and heat and/or ultraviolet light stabilizers. Resinous organosiloxane copolymers can be used in place of or in combination with one or more reinforcing fillers to improve the physical properties of the cured organosiloxane composition.

A preferred type of resinous copolymer contains repeating units of the general formula $SiO_{4/2}$ in addition to triorganosiloxy units of the general formulae $R_3^{10}SiO_{\frac{1}{2}}$ and diorganovinylsiloxy units of the general formula $CH_2=CH(R^{11})_2SiO_{\frac{1}{2}}$. In these formulae $R^{10}$ and $R^{11}$ are individually monovalent hydrocarbon or substituted monovalent hydrocarbon radicals as previously defined for the $R^8$ radicals of ingredient A.

The molar ratio of the combination of triorganosiloxy units and diorganovinylsiloxy units to $SiO_{4/2}$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy: $SiO_{4/2}$ units is 0.08–0.1:0.06–1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxy units than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by $R^1$ and $R^2$ in the foregoing formula.

Preparation of Curable Compositions

The compositions of this invention can be prepared by combining all of ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers and two- and three-roll rubber mills, Cooling of the ingredients during mixing may be desirable to avoid premature curing of the composition.

To maximize storage stability, the curable compositions are preferably kept in closed containers until used. If greater storage stability is desired, the compositions can be packaged in two or more containers with the organohydrogensiloxane (ingredient B) and the platinum group metal catalyst in separate containers.

Depending upon. the types and concentrations of ingredients A and B, cured organosiloxane materials can vary in properties from brittle resins to elastomers to gels. In accordance with the present method the curable composition is applied over a layer of organohydrogensiloxane covering the solder flux or other acid-containing material.

In accordance with the present method curable organosiloxane compositions are applied over a layer of organohydrogensiloxane as a coating or as an uncured molded or extruded article. Unfilled organosiloxane compositions are particularly useful as gels, adhesives, protective coatings, encapsulants and potting compositions for protecting delicate electronic devices such as transistors and integrated circuits from damage by moisture and other materials present in the environment that can adversely affect operation of the device. The compositions can be used to coat either the individual devices or a circuit board containing a number of these devices together with other electronic components.

The curable compositions can be applied to substrates by pouring, spraying, dipping, extrusion or by the use of a brush, roller or coating bar. The selection of a particular application method will be determined at least in part by the viscosity of the curable composition. The viscosity of the composition can be reduced using suitable solvents or reactive diluents as known in the art.

Curing of the present compositions commences when ingredients A, B and C are combined. Preferred compositions cure over a period of several hours under ambient conditions. As is true for other compositions that cure by a platinum-catalyzed hydrosilation reaction, curing can be accelerated by heating. Curing temperatures of from 25° to about 80° C. are preferred.

The following example describes preferred embodiments of the present method and compositions useful in accordance with this method. The examples should not be interpreted as limiting the scope of the invention defined in the accompanying claims. Unless otherwise specified all parts and percentages in the example are by weight and viscosities were measured at 25 C.

EXAMPLE 1

This example demonstrates the effect of placing a layer of an organohydrogensiloxane between a "no-clean" solder paste containing a carboxylic acid and an organosiloxane composition that is curable by a platinum catalyzed hydrosilation reaction.

The curable organosiloxane composition was prepared by blending the following ingredients to homogeneity:

98.5 parts of a dimethylvinylsiloxy-terminated polydimethylsiloxane having a viscosity of 0.4 Pa.s at 25° C.;

1.1 parts of a trimethylsiloxy-terminated polydiorganosiloxane having an average of five methylhydrogensiloxane units and three dimethylsiloxane units per molecule with a silicon-bonded hydrogen atom content of 0.8 weight percent;

0.3 part of a liquid dimethylhydrogensiloxy-terminated polydimethylsiloxane containing 0.16 weight percent of silicon-bonded hydrogen;

0.15 part of a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent; and 0.01 part of 2-phenyl-3-butyn-2-ol and 0.001 part of N,N,N',N'-tetramethylethylenediamine as platinum catalyst inhibitors.

Coatings of two different acid-containing solder pastes, referred to hereinafter as X and Y, available as types RMA390-HRFM6 and RMA390-DH4 from Alpha Metals were applied over about one quarter of one surface of two types of substrates. Typical solder pastes contain about 90 weight percent of solder, 6 weight percent of rosin, 2 weight percent of a glycol ether type solvent, 1 percent of a thickener and about 1 weight percent of a carboxylic acid and other modifiers. Flux X contained a lower concentration of low molecular weight carboxylic acids than flux Y.

One substrate (A) was a planar sintered aluminum oxide sheet measuring 9 by 4 cm. that had a printed electrical circuit on one surface. The second substrate (B) was a epoxy/fiberglass type of printed circuit board identified as an "FR-4 board". All of the samples were then heated at 225° C. for 2.5 minutes to cause flowing of the solder, and allowed to cool to ambient temperature.

A layer of one of three liquid polydiorganosiloxanes containing silicon-bonded hydrogen atoms was then applied as a primer over the entire surface containing the solder flux by applying several drops of the polydiorganosiloxane onto the surface and allowing the drops to flow and coalesce into a continuous coating. The thickness of the coating was about 0.0013 mm.

For comparative purposes one sample of each type of substrate was not coated with primer prior to application of the curable composition. The curable composition was in the form of a liquid that was poured over the primer layer and over the solder flux on the comparative samples. The compositions was cured by heating the coated test samples for 30 minutes at 120° C.

The three organohydrogensiloxanes evaluated as primers were

I=a liquid trimethylsiloxy-terminated polymethylhydrogensiloxane containing an average of 37 repeating units per molecule and about 1.6 percent of silicon-bonded hydrogen.

II=a trimethylsiloxy-terminated polydiorganosiloxane containing an average of five methylhydrogensiloxane units and three dimethylsiloxane units per molecule and about 0.8 percent of silicon-bonded hydrogen.

III=a liquid dimethylhydrogensiloxy-terminated polydimethylsiloxane containing an average of 20 repeating units per molecule and 0.16 weight percent of silicon-bonded hydrogen.

The extent of curing of the compositions in the area over and immediately adjacent to the solder flux was evaluated and rated in accordance with the following scale:

1=complete cure with adhesion over 100 percent of surface, no uncured or partially cured material present.

2=complete cure with adhesion over greater than 90 percent of the surface, partial curing on remainder.

3=complete cure with adhesion over 60 to 90 percent of surface, partial curing on remainder.

4=less than 60% of composition cured, cured material not adhered to substrate.

The results of the evaluation are recorded in the following table

| Flux | Primer | Cure Rating Substrate A | Substrate B |
|------|--------|-------------------------|-------------|
| X | I | 1 | 1 |
| X | II | 1 | 1 |
| X | III | 2 | 1 |
| X | None* | 2 | 2 |
| Y | I | 2 | 3 |
| Y | II | 1 | 1 |
| Y | III | 3 | 3 |
| Y | None* | 4 | 3 |

* = Comparative Example

The data in this table demonstrate the improved curing that occurs using a primer containing at least two silicon-bonded hydrogen atoms per molecule in accordance with the present method.

That which is claimed is:

1. A method for curing an organosiloxane composition containing an organohydrogensiloxane as the curing agent when said composition is in contact with a substrate having on its surface a solder paste comprising at least one cure-inhibiting component, said method comprising the sequential steps of 1) applying a layer of a liquid organosilicon compound containing at least two silicon-bonded hydrogen atoms per molecule to at least those portions of said substrate containing said cure-inhibiting component, wherein said layer is as thin as possible while being sufficient to overcome the effect of the cure-inhibiting component, 2) applying a curable organosiloxane composition over said layer of liquid organosilicon compound, the composition comprising A) a polyorganosiloxane containing an average of at least two alkenyl radicals or silanol groups per molecule and exhibiting a viscosity greater than 0.1 Pa.s;

B) an amount of a liquid organohydrogensiloxane sufficient to cure said composition, where said organohydrogensiloxane contains an average of at least two silicon-bonded hydrogen atoms per molecule, with the proviso that the sum of the average number of alkenyl radicals or silanol groups per molecule present in said polyorganosiloxane and the average number of silicon-bonded hydrogen atoms per molecule in said organohyrogensiloxane is greater than 4, and the molar ratio of silicon bonded hydrogen atoms in said organohydrogensiloxane to alkenyl radicals or silanol groups in said polyorganosiloxane is from 0.3 to 20; and C) an amount of a catalyst sufficient to promote curing of said composition, where said catalyst is a platinum group metal or a compound of said metal; and 3) exposing said composition to conditions that promote curing of said composition in the presence of said catalyst, whereby curing of said composition in the presence of said component is enabled by the presence of said layer of a liquid organosilicon compound.

2. A method according to claim 1 wherein the polyorganosiloxane is a polydiorganosiloxane corresponding to the formula

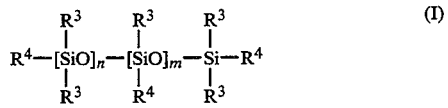

where each $R^3$ is individually selected from monovalent hydrocarbon radicals and monovalent halohydrocarbon radicals, $R^4$ represents an alkenyl radical or a hydroxyl group, m is 0 or a positive integer, the sum of m and n represents a degree of polymerization equivalent to a viscosity of at least 1000 centipoise (1 Pa.s); the catalyst is a platinum compound and is present at a concentration equivalent to from 0.1 to 500 parts by weight of platinum per million parts, based on the combined weight of said polyorganosiloxane and said organohydrogensiloxane, and said organosilicon compound is a polyorganohydrogensiloxane containing at least 3 silicon-bonded hydrogen atoms per molecule.

3. A method according to claim 2 where $R^3$ is alkyl or haloalkyl containing from 1 to 10 carbon atoms or phenyl, R4 is vinyl or 5-hexenyl, said organosiloxane composition cures to form a gel.

4. A substrate coated with a cured organosiloxane composition, where said substrate having on its surface a solder paste comprising at least one cure-inhibiting component is prepared in accordance with the method of claim 1.

* * * * *